United States Patent
White et al.

(10) Patent No.: US 9,881,302 B1
(45) Date of Patent: *Jan. 30, 2018

(54) INTELLIGENT PAYMENT CAPTURE IN FAILED AUTHORIZATION REQUESTS

(71) Applicant: Square, Inc., San Francisco, CA (US)

(72) Inventors: Michael Wells White, San Francisco, CA (US); Paul Botros, San Francisco, CA (US); Christopher Lang Mocko, San Francisco, CA (US); Zhimin Ren, San Francisco, CA (US); Jianliang Zhao, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 270 days.

This patent is subject to a terminal disclaimer.

(21) Appl. No.: 14/567,118

(22) Filed: Dec. 11, 2014

(51) Int. Cl.
- *G06Q 20/20* (2012.01)
- *G06Q 20/10* (2012.01)
- *G06Q 20/40* (2012.01)

(52) U.S. Cl.
CPC ............ *G06Q 20/40* (2013.01); *G06Q 20/20* (2013.01)

(58) Field of Classification Search
CPC combination set(s) only.
See application file for complete search history.

(56) References Cited

U.S. PATENT DOCUMENTS

| 7,866,546 | B1 | 1/2011 | Vance |
| 2002/0132662 | A1 | 9/2002 | Sharp et al. |
| 2003/0222138 | A1* | 12/2003 | Oppenlander ......... G06Q 20/10 235/380 |
| 2007/0106558 | A1 | 5/2007 | Mitchell et al. |
| 2009/0063339 | A1 | 3/2009 | Santora |
| 2012/0078789 | A1* | 3/2012 | Harrell ................... G06Q 20/12 705/44 |
| 2015/0229623 | A1 | 8/2015 | Grigg et al. |

OTHER PUBLICATIONS

U.S. Appl. No. 14/567,145, of White, M.W., et al., filed Dec. 11, 2014.
Final Office Action dated Dec. 29, 2016, for U.S. Appl. No. 14/567,145, of White, M.W., et al., filed Dec. 11, 2014.
Notice of Allowance dated Apr. 17, 2017, for U.S. Appl. No. 141567,145, of White, M.W., et al., filed Dec. 11, 2014.
Non-Final Office Action dated Apr. 21, 2016, for U.S. Appl. No. 14/567,145, of White, M.W., et al., filed Dec. 11, 2014.

* cited by examiner

*Primary Examiner* — Luna Champagne
(74) *Attorney, Agent, or Firm* — Lee & Hayes, PLLC

(57) ABSTRACT

Techniques and arrangements for capturing payments in cases involving a failed authorization. In some instances, a point-of-sale (POS) device may process a transaction while operating in an offline mode, and then send information regarding the transaction to a remote service after transitioning to an online mode. The remote service may attempt to authorize a payment instrument tendered to satisfy a cost of the transaction. In instances in which the payment instrument is declined, one or multiple payment-capture techniques may be utilized to capture a payment that satisfies at least a portion of the cost of the transaction.

8 Claims, 8 Drawing Sheets

INTELLIGENT PAYMENT CAPTURE IN FAILED AUTHORIZATION REQUESTS

BACKGROUND

In today's commerce, merchants often utilize an array of different point-of-sale (POS) devices, including mobile POS devices. Merchants may use these POS devices to engage in transactions with customers at different locations. For instance, a taxi driver may use a mobile POS device to charge a passenger for a taxi ride. In another example, a street vendor may use a mobile POS device to charge a customer for an item purchased from the street vendor.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
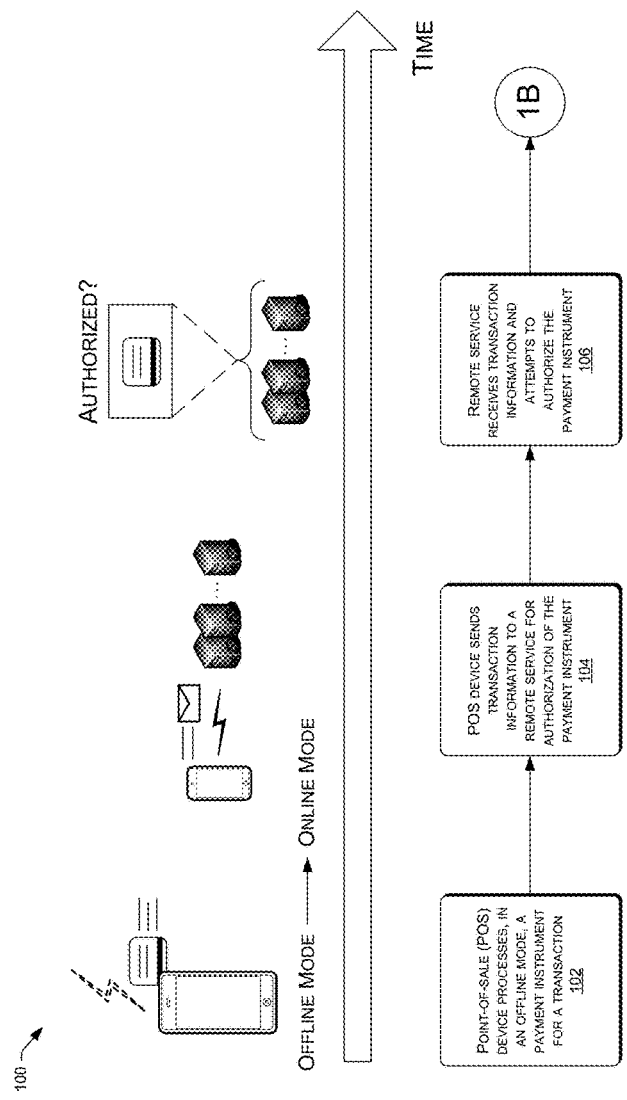
FIGS. 1A and 1B collectively illustrate an example process for capturing a payment in a transaction involving a payment instrument that has been declined with respect to the transaction.

Some implementations described herein include techniques and arrangements for capturing payments in transactions. A payment service may, in various examples, attempt to authorize a payment instrument tendered in a transaction to satisfy a cost. In some instances, the payment instrument may be declined (i.e., the payment instrument may fail to authorize) with respect to the cost of the transaction. One or more of the payment-capture techniques described herein may be utilized in such instances to capture a payment that satisfies at least a portion of the cost of the transaction.

As will be described in further detail below with reference to the figures, the payment-capture techniques may, in some cases, include authorizing the payment instrument with respect to an available balance of the payment instrument. In various cases, the payment-capture techniques may additionally or alternatively include re-attempting to authorize the payment instrument during one or multiple future time periods. Additionally or alternatively, the payment-capture techniques may include providing a customer an opportunity to resolve a failed authorization (e.g., by requesting that the customer cooperate in satisfying at least a portion of the cost of the transaction).

For clarity, various examples in this disclosure describe payment-capture techniques performed or otherwise implemented by a payment service. However, it should be understood that, in various instances, any other suitable service, entity, device, system, or any combination thereof, can perform/implement the payment-capture techniques described herein.

In some implementations, a customer may provide a payment instrument (e.g., a prepaid card, a debit card, a credit card, and/or a gift card, etc.) to pay for a good or a service that the customer receives from a merchant. The customer and/or the merchant may then input an identifier associated with the payment instrument into a POS device by, for example, swiping the payment instrument, typing in a number of the payment instrument, or the like.

Additionally or alternatively, the customer and/or the merchant may transmit payment instrument information (including, e.g., an identifier) associated with the payment instrument to the POS device. For example, the customer may possess an electronic device capable of storing or accessing the payment instrument information. In this example, the customer may use the electronic device to transmit the payment instrument information to the POS device. In some cases, the electronic device of the customer may transmit the payment instrument information to the POS device via near-field communication (NFC) technology. In other cases, the electronic device of the customer may additionally or alternatively transmit the payment instrument information to the POS device via one or more wired or wireless networks, such as a WiFi network, a cellular network, or the like. It should be understood, however, that the electronic device of the customer may transmit the payment instrument information to the POS device via any other suitable transmission method and/or technology in addition to, or instead of, those described herein.

When the POS device is operating in an online mode, the POS device sends transaction information including the identifier of the payment instrument to a payment service for authorization of the payment instrument. In some instances, the POS device sends this information to the payment instrument substantially contemporaneously with the POS device receiving the identifier of the payment instrument. Usually after a short delay, the POS device may receive an indication of whether the payment instrument has been approved (i.e., authorized) or declined (i.e., failed to authorize) for an amount of the transaction, such as a cost of the good or service. However, this "authorization delay" may increase based on certain factors, such as an increase in network latency or a slowdown in the authorization process at a payment service. These delays may be unacceptable during certain peak hours at the merchant (e.g., when the merchant has a long line and wishes to avoid customers from having a negative experience due to a long wait). Accordingly, for various reasons, the merchant may at times operate the POS device in an offline mode instead of operating the POS device in the online mode.

When the POS device operates in the offline mode, however, the POS device may locally store transaction information including the identifier of the payment instrument for later sending to the payment service after the POS device transitions back into the online mode. POS devices of this nature may transition to this offline mode when the devices lose network connectivity (e.g., due to being at a location that lacks network connectivity) or in response to an operator manually transitioning to the offline mode using a merchant application executing on the device. In some instances, however, the POS device may be configured to automatically transition between the modes based on factors other than network connectivity.

In some examples, the payment service may receive transaction information/data from the POS device after the POS device transitions from operating in the offline mode to operating in the online mode. That is, the POS device may process a transaction while operating in the offline mode, and then send the corresponding transaction information to the payment service while operating in the online mode.

The payment service may determine that a payment instrument associated with the received transaction information is yet to be authorized. That is, the payment service may determine that an authorization status of the payment instrument has not been determined. In some cases, the payment service may make such a determination based at least in part on the received transaction information. For instance, the payment service may receive, from the POS device, a request to authorize the payment instrument. The payment service, in some cases, may determine that the payment instrument has not been authorized based at least in part on the request received from the POS device. In some instances, the transaction information received from the POS device may include an indication that the authorization status of the payment instrument has been determined with respect to the transaction.

After receiving the transaction information, the payment service may attempt to authorize the payment instrument with respect to the cost of the transaction. This authorizing may include communicating with computing devices of a card payment network (e.g., MasterCard®, Visa®, etc.) and/or an issuing bank associated with the payment instrument to determine whether the payment instrument is authorized for the cost of the transaction.

If the payment instrument is declined with respect to the cost of the transaction, then the payment service may utilize one or more intelligent payment-capture techniques to mitigate loss of payment in the transaction.

In various examples, the payment-capture techniques of this disclosure may be utilized in "offline-to-online" contexts, i.e., scenarios in which a POS device processes a transaction while operating in an offline mode and sends the corresponding transaction information to a payment service after transitioning to an online mode. In the offline mode, a POS device of a merchant may be unable to request an authorization status of a payment instrument tendered to satisfy a cost of a transaction between the merchant and a customer/holder of the payment instrument. By the time the POS device transitions to the online mode, the customer may no longer be as accessible to the merchant as during the transaction. Accordingly, in the status quo, these circumstances may result in the merchant failing to capture a payment in the transaction. Although various examples in this disclosure involve payment-capture techniques being utilized in the "offline-to-online" contexts described above, it should be understood that the payment-capture techniques are not limited to such contexts.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

Figure 1B:
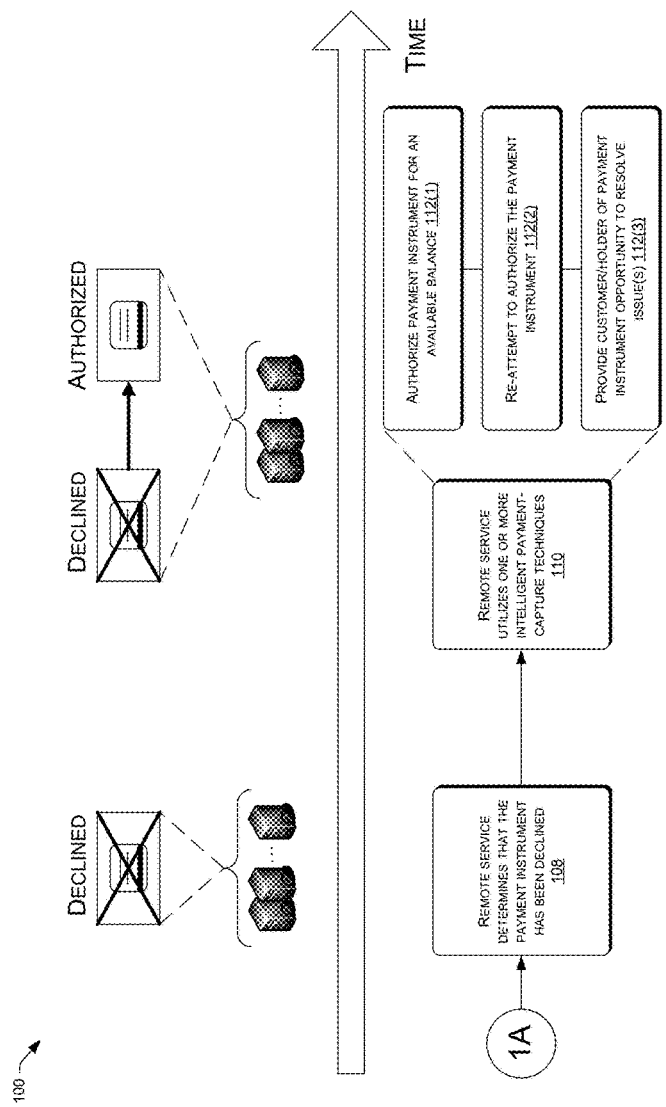

FIGS. 1A and 1B collectively illustrate an example process for capturing a payment in a transaction involving a payment instrument that has already been declined at least once with respect to the transaction.

FIG. 1A illustrates, at 102, a POS device processing, in an offline mode, a payment instrument for a transaction. That is, a merchant associated with the POS device may have "swiped", "dipped", or otherwise inputted information regarding the payment instrument for a transaction. For instance the merchant may have swiped the payment instrument for the cost associated with the transaction. The merchant may have received the payment instrument from a customer in exchange for goods or services provided to the customer by the merchant.

At 104, the POS device transitions from the offline mode to the online mode and, in response, sends transaction information, including information regarding the payment instrument, over a network and to a remote service for authorization. For instance, the POS device may send a request to authorize the payment instrument for an amount/cost of the transaction. In some cases, the transaction information may include an identifier that identifies the payment instrument. Additionally or alternatively, the transaction information may include an indication indicating that an authorization status of the payment instrument has not yet been determined for the transaction. For example, the POS device may include such an indication in the transaction information if the corresponding transaction was processed while the POS was operating in the offline mode.

At 106, the remote service receives the transaction information and attempts to authorize the payment instrument. This authorizing may include communicating with computing devices of a card payment network (e.g., MasterCard®, Visa®, etc.) and/or an issuing bank associated with the payment instrument to determine whether the payment instrument is authorized for the cost of the transaction.

FIG. 1B continues the illustration of the process 100 and, at 108, the remote service determines that the payment instrument has been declined with respect to the cost of the transaction. At this point, because of the time that has passed since processing the payment instrument at the POS device, the customer may no longer be physically available at or near the POS device. Thus, the merchant may be unable to request that the customer provide an alternative form of payment or otherwise resolve the issue(s) causing the payment instrument to be declined.

In some examples, the remote service may determine that the payment instrument has been declined based on an indication received in response to an attempt to authorize the payment instrument. For instance, the remote service may generate a request for an authorization status with respect to the payment instrument. The remote service may send the request to one or more computing devices of a card payment network (e.g., MasterCard®, Visa®, etc.) and/or an issuing bank associated with the payment instrument. The remote service may then receive an authorization status indicating whether the payment instrument is authorized.

If the payment instrument has been declined, the remote service may receive a decline reason indicating the reason(s) why the payment instrument was declined. For instance, the decline reason may indicate that the payment instrument was declined due to insufficient funds. That is, the decline reason may indicate that a value of the payment instrument failed to satisfy the cost of the transaction. As another non-limiting example, the decline reason may indicate that the payment instrument was declined due to a fraud alert being placed in association with the payment instrument.

At 110, after determining that the payment instrument has been declined, the remote service implements one or more intelligent payment-capture techniques. In some implementations, the payment-capture techniques may include authorizing a payment instrument for an available balance of the payment instrument, at 112(1). For example, upon or after determining that the payment instrument has been declined with respect to the cost of the transaction, the remote service may determine an available balance of the payment instrument. The available balance may correspond to a monetary value of the payment instrument at the time of determining the available balance. The available balance may change from time to time, however, depending on, for example, a transfer of money to or from an account associated with the payment instrument.

In some instances, the remote service may compare the available balance of the payment instrument with a payment threshold, and determine whether the available balance satisfies the payment threshold. The payment threshold may represent, or otherwise correspond to, an acceptable payment towards the cost of the transaction. For example, a merchant associated with the transaction may determine a percentage (or the like) of the transaction that the merchant would accept in the event that the payment instrument is declined with respect to the cost of the transaction. In some cases, the merchant may additionally or alternatively express the payment threshold/acceptable payment in absolute terms. For instance, in a $100 transaction, the merchant may indicate a payment threshold of 50% and/or indicate a payment threshold of $50.

In some cases, the merchant may indicate multiple payment thresholds, and the multiple payment thresholds may include at least one payment threshold that is different from the rest of the payment thresholds. For example, the merchant may determine multiple payment thresholds that individually correspond to different authorization attempts. As another example, the merchant may set different payment thresholds that decrease as a number of authorization attempts increases and/or as a passage of time increases.

In a particular illustrative and non-limiting example, the cost of the transaction may be $100. The merchant may indicate: a first payment threshold of 90% of the cost of the transaction to be applied after a first time the payment instrument is declined, a second payment threshold of 80% of the cost of the transaction to be applied after a second time the payment instrument is declined, and so on. That is, in this example, if the available balance does not satisfy the first payment threshold of 90% after the payment instrument is declined a first time, then the remote service may determine not to authorize the payment instrument with respect to the available balance. Instead, the remote service may determine a future time period during which a value of the payment instrument is expected to increase, and then, during the future time, the remote service may attempt to authorize the payment instrument with respect to the full cost of the transaction. If the payment instrument is declined a second time, then the remote service may determine if the available balance of the payment instrument (which may have changed) satisfies the second payment threshold of 80% of the cost of the payment instrument. In this manner, the merchant may initially attempt to capture a high-value payment for the transaction, and then incrementally relax the payment threshold to capture a lower, but acceptable payment.

In various cases, the merchant may provide the payment threshold via one or more inputs to the POS device. The POS device may communicate these inputs to the remote service. In some cases, the remote service may utilize the payment threshold provided by the merchant. In other cases, however, the remote service may additionally or alternatively determine and utilize a different payment threshold. For example, the remote service may determine a payment threshold based on various parameters, which may include the payment threshold provided by the merchant and/or payment threshold input provided by other entities.

In various examples, the payment threshold may apply to a particular transaction, a set of transactions, transactions from a particular merchant, transactions from a set of merchants, transactions involving a particular payment instrument, transactions involving a class of payment instruments, transactions involving a particular customer, etc., or any combination thereof.

In some implementations, upon or after authorizing the payment instrument with respect to the available balance, the remote service may calculate a remaining amount of the cost of the transaction. That is, the remote service may calculate an amount of the cost of the transaction that remains after subtracting, or otherwise accounting for, an amount of the available balance for which the payment instrument has been authorized. In some instances, the remote service may determine that an authorizable value of the payment instrument is expected to increase during a future time period. Accordingly, the remote service may attempt to authorize, during the future time period, the payment instrument with respect to the remaining amount of the cost of the transaction.

As used herein, the term "authorizable value" means the value for which the payment instrument would be successfully authorized (e.g., in response to a request to authorize the payment instrument). For instance, the authorizable value of a debit card may correspond to the available balance of the debit card. As another example, the authorizable value of a credit card may correspond to the difference in value between the credit limit associated with the credit card and the unpaid balance of the credit card. The authorizable value of a payment instrument may change from time to time (e.g., based on a transfer of money to or from an account associated with the payment instrument, a credit limit increase, a credit limit decrease, etc.).

In various implementations, the payment-capture techniques may include re-attempting to authorize the payment instrument with respect to at least a portion of the cost of the transaction, at 112(2). For example, the remote service may re-attempt to authorize the payment instrument with respect to the cost of the transaction at least partly in response to one or more of: determining that the payment instrument has been declined, determining that an authorizable value of the payment instrument is expected to increase during a future time period, inferring that the authorizable value of the payment instrument has increased, or determining that the POS device processed the transaction in the offline mode.

In some cases, the remote service may determine that an authorizable value of the payment instrument is expected to increase during a future time period based at least in part on historical transaction data. The historical transaction data may include data corresponding to transactions that occurred over a period of time before the time at which the remote service determines that the authorizable value of the payment instrument is expected to increase. In some cases, the remote service may access the historical transaction data from one or more data stores accessible to the remote service, including data stores that are local to the remote service and/or data stores that are located remotely.

In various non-limiting examples, the historical transaction data may include data associated with a particular transaction, a set of transactions, transactions corresponding to a particular merchant, transactions corresponding to a set of merchants, transactions involving a particular payment instrument, transactions involving a class of payment instruments, transactions involving a particular customer, etc., or any combination thereof. In some cases, the remote service may analyze historical data pertaining to a particular payment instrument to determine when the holder of the payment instrument typically pays off a balance associated with the payment instrument or otherwise increases the authorizable value of the payment instrument.

In various examples, the remote service may determine that the authorizable value of the payment instrument is expected to increase periodically. Additionally or alternatively, the remote service may determine that the authorizable value of the payment instrument is expected to increase during one or multiple time periods that individually correlate to a standard pay period, a standard credit card bill payment period or the like, and/or a period during which a holder of the payment instrument typically pays or is assumed to make a payment towards a credit card bill or the like. For example, the remote service may determine that the authorizable value of the payment instrument is expected to increase during the first ($1^{st}$) and/or fifteenth ($15^{th}$) days of each month.

Likewise, the remote service may determine the authorizable value of the payment instrument is expected to increase during a time period that is offset a predetermined amount of time (e.g., a predetermined number of days) from a standard pay period. For example, the remote service may determine that the authorizable value of the payment instrument typically increases on the first $1^{st}$ day of the month because it correlates to a standard pay day. In some cases, the remote service may determine that the authorizable value of the payment instrument However, in some cases, an increased value of the payment instrument may be in a "pending" status for a short period of time (e.g., a day or two) during which the payment instrument would be declined with respect to the increased value. In such cases, the remote service may determine the authorizable value of the payment instrument actually increases for authorization purposes on the $2^{nd}$ or $3^{rd}$ day of the month, for example.

In some instances, the remote service may re-attempt to authorize the payment instrument with respect to the cost of the transaction at least partly in response to inferring that an authorizable value of the payment instrument has increased. For example, the remote service may receive an indication indicating that the payment instrument has been authorized for a different transaction. In this example, the remote service may infer that the authorizable value of the payment instrument has increased based at least in part on the indication indicating that the payment instrument has been authorized for a different transaction.

In some cases, a merchant in the transaction may be allowed to determine when the remote service is to re-attempt to authorize the payment instrument. For instance, the merchant may be able to select one or multiple time periods that may prompt the remote service to re-attempt to authorize the payment instrument.

In various implementations, the payment-capture techniques may include providing a customer/holder of the payment instrument an opportunity to resolve the issue(s) causing the payment instrument to be declined, at 112(3). For example, the remote service and/or a merchant with a stake in the transaction may communicate with the customer to request that the customer cooperate in satisfying at least a portion of the cost of the transaction via the payment instrument. Additionally or alternatively, the remote service and/or the merchant may communicate with the customer to request that the customer submit an alternative form of payment (i.e., request that the customer cooperate in satisfying at least a portion of the cost of the transaction via another payment instrument).

In some examples, the remote service may receive a decline reason indicating the reason(s) why the payment instrument was declined. The remote service may retrieve the contact information of the customer and communicate with the customer directly, provide the contact information to the merchant such that the merchant is capable of communicating with the customer, or both.

In some instances, the customer may provide contact information at the time of the transaction and/or at the time of any other transaction. For example, the customer may provide an e-mail address, a physical address, a mailing address, and/or a phone number. However, it should be understood that the customer can additionally or alternatively provide any other identifier associated with a suitable communication vehicle enabling the merchant and/or the remote service to contact the customer.

In some cases, however, the customer might not have provided any contact information at the time of the transaction. In such cases, the remote service may attempt to locate the contact information in one or more databases accessible to the remote service. For example, the remote service may retrieve contact information of the customer by searching through one or more databases that link an identifier of the payment instrument with the contact information of the buyer.

In various examples, the remote service and/or the merchant may communicate with the customer by one or more of: sending the customer an automated e-mail, sending the customer an e-mail requesting permission to re-attempt to authorize the payment instrument, sending the customer a form for inputting valid payment instrument information, or sending the customer a copy of a digital receipt that includes transaction information associated with the transaction. Additionally or alternatively, communicating with the customer may include placing phone calls to the customer via, for example, an automated calling system and/or a human agent.

In some cases, the remote server may determine to proceed directly to communicating with the customer in response to the payment instrument being declined. For instance, the remote server may determine that a type of payment instrument (e.g., a prepaid debit card), upon being depleted in value, may be unlikely to increase in authorizable value in the future. In such instances, the remote server may determine to communicate with the customer as a next step instead of re-attempting to authorize the card without seeking customer cooperation.

In various implementations, multiple payment-capture techniques described herein can be performed with respect to a single transaction. For example, in response to the payment instrument being declined, the remote service may attempt to authorize the payment instrument with respect to an available balance before re-attempting to authorize the payment during a future time period, or vice-versa.

Figure 2:
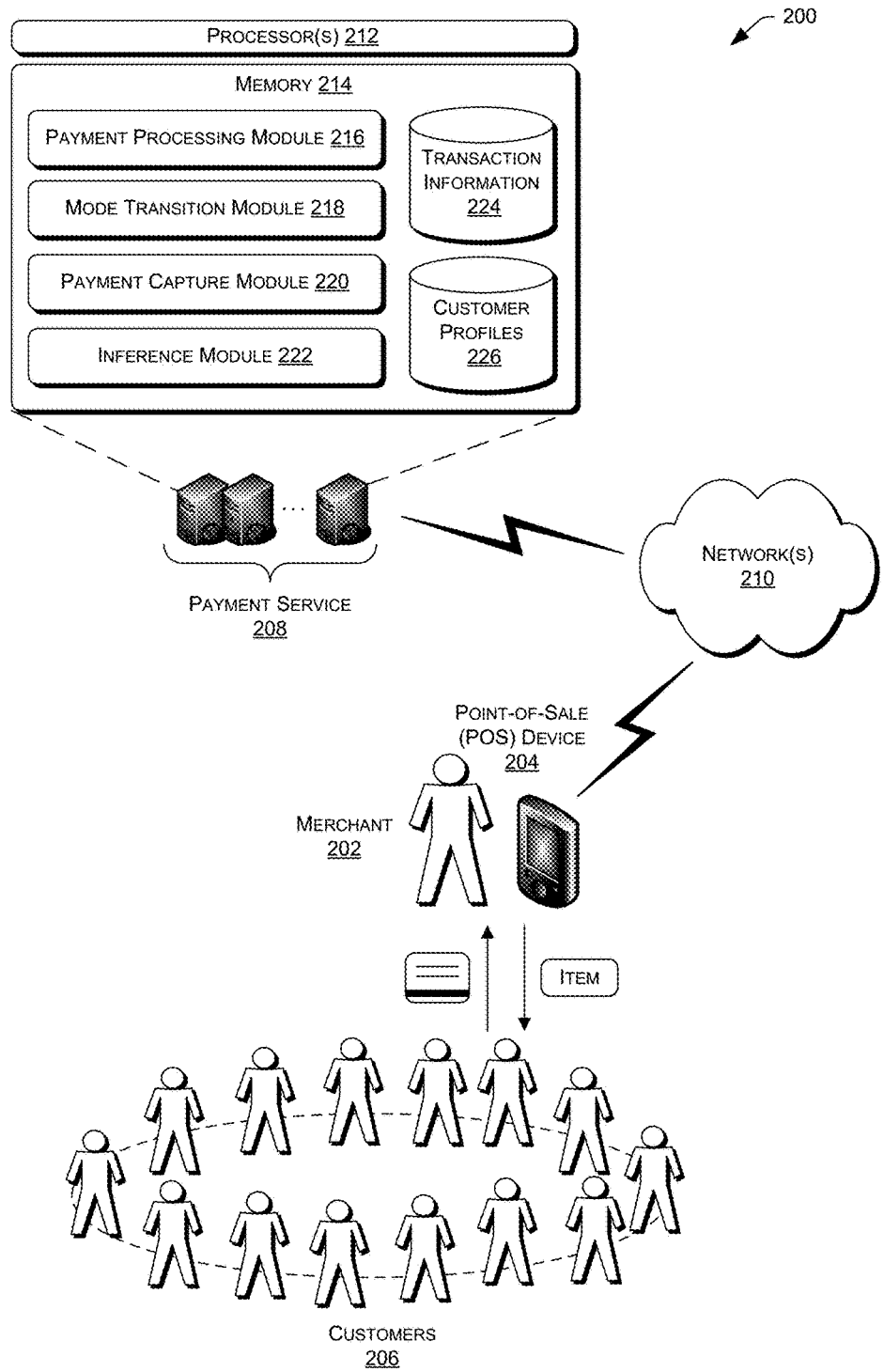
FIG. 2 illustrates an example environment that includes a merchant operating a mobile point-of-sale (POS) device to conduct transactions with customers. The example environment further includes a payment service that receives transaction information from the merchant, authorizes payment instruments, and captures payments. In some instances, the payment service may capture a payment in a transaction involving a payment instrument that has previously been declined with respect to the transaction.

FIG. 2 illustrates an example environment 200 that includes a merchant 202 operating a mobile point-of-sale (POS) device 204 to engage in various transactions with customers 206. The POS device 204 may comprise any sort of mobile or non-mobile device that includes an instance of a merchant application that executes on the respective device. The merchant application may provide POS functionality to the POS device 204 to enable the merchant 202 (e.g., an owner, employees, etc.) to accept payments from the customers 206. In some types of businesses, the POS device 204 may correspond to a store or other place of business of the merchant, and thus, may be a fixed location that typically does not change on a day-to-day basis. In other types of businesses, however, the POS device 204 may change from time to time, such as in the case that the merchant operates a food truck, is a street vendor, is a cab driver, etc., or has an otherwise mobile business, e.g., in the case of merchants who sell items at buyers' homes, places of business, and so forth.

As used herein, a merchant may include any business engaged in the offering of goods or services for acquisition by customers. Actions attributed to a merchant may include actions performed by owners, employees, or other agents of the merchant and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a transaction may include a financial transaction for the acquisition of goods and/or services that is conducted between a customer and a merchant. For example, when paying for a transaction, the customer can provide the amount that is due to the merchant using a payment instrument (e.g., a debit card, a credit card, a stored-value or gift card, a check, through an electronic payment application on a device carried by the customer, or the like). The merchant can interact with the POS device 104 to process the transaction, such as by inputting (e.g., manually, via a magnetic card reader or an RFID reader, etc.) an identifier associated with the payment instrument. For example, a payment instrument of one of the customers 206 may include one or more magnetic strips for providing card and customer information when swiped in a card reader. In other examples, other types of payment cards may be used, such as smart cards having a built-in memory chip, a radiofrequency identification tag, or so forth.

During the transaction, the POS device 204 can determine transaction information describing the transaction, such as the identifier of the payment instrument, an amount of payment received from the customer, the item(s) acquired by the customer, a time, place and date of the transaction, and so forth. The POS device 204 can send the transaction information to a payment service 208 over a network 210, either substantially contemporaneously with the conducting of the transaction (in the case of online transactions) or later when the device 204 is in the online mode (in the case offline transactions).

In an offline transaction, the POS device 204 may store one or more characteristics associated with the transaction (i.e., the transaction information), such as a cost of the transaction, a time of day at which the transaction occurred, a day of the week at which the transaction occurred, a location at which the transaction took place, an item that the customer obtained, and a payment instrument used in the transaction. After conducting an offline transaction with one of the customers 206, the POS device 204 may provide the stored information to the payment service 208 over the network 210. The network 210 may represent any one or more wired or wireless networks, such as a WiFi network, a cellular network, or the like.

The POS device 204 may be configured to automatically transition between the online mode and the offline mode based on an array of different reasons other than simply a loss of network connectivity. For instance, the POS device 204 may transition to the offline mode in order to increase an efficiency of transactions conducted between the merchant 202 and the customers 206. The POS device 204 may make this transition in response to a rate increase in sales volume being greater than a threshold, in response to an amount of transactions over a given time being greater than a threshold, in response to anticipating an increase in future transactions (e.g., based on historical sales data), or the like. In some instances, the POS device 204 may provide an option to the user to transition to the offline mode, rather than automatically transition to the offline mode.

As illustrated, the payment service 208 may include one or more processors 212 and memory 214, which may store a payment processing module 216, a mode transition module 218, a payment capture module 220, an inference module 222, transaction information via a transaction information data store 224, and customer profiles via a customer profiles data store 226.

The payment processing module 216 may function to receive information regarding a transaction from the POS device 204 and attempt to authorize the payment instrument used to conduct the transaction. The payment processing module 216 may store the received transaction information in the transaction information data store 224. In some cases, the payment processing module 216 may then send an indication of whether the payment instrument has been approved or declined back to the POS device 204.

Generally, when a customer and a merchant enter into an electronic payment transaction, the transaction is processed by electronically transferring funds from a financial account associated with the customer to a financial account associated with the merchant. As such, the payment processing module 216 may communicate with one or more computing devices of a card payment network, e.g., MasterCard®, VISA®, over the network 210 to conduct financial transactions electronically. The payment processing module 216 can also communicate with one or more computing devices of one or more banks over the network 210. For example, the payment processing module 216 may communicate with an acquiring bank, an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

The mode transition module 218 may function to determine when to instruct the POS device 204 to transition modes, such as when to transition from an online mode to an offline mode, and vice-versa. While the mode transition module 218 is illustrated at the payment service 208, in some implementations a merchant application executing on the POS device 204 (discussed with reference to FIG. 7) may instead or additionally perform some or all of the functionality of the mode transition module 218.

The payment capture module 220 may function to determine which of the payment-capture techniques to utilize, and when to utilize them, after a payment instrument has been declined. That is, the payment capture module 220 may drive implementation of the payment-capture techniques. In some cases, the payment capture module 220 may determine to authorize a payment instrument with respect to an available balance of the payment instrument. Additionally or alternatively, the payment capture module 220 may determine to re-attempt to authorize the payment instrument for at least a portion of a cost of a transaction. In some cases, the payment capture module 220 may additionally or alternatively provide a customer an opportunity to resolve a failed authorization.

The inference module 222 may infer and/or determine that an authorizable value of the payment instrument has increased, or that an authorizable value of the payment instrument is expected to increase during a future time period. The inference module 222 may obtain data from one or more data stores, including, for example, the transaction information data store 224 and the customer profiles data store 226. It should be understood, however, that the inference module 222 may also base its determinations/inferences on data obtained from any other suitable local and/or remote source.

Figure 3:
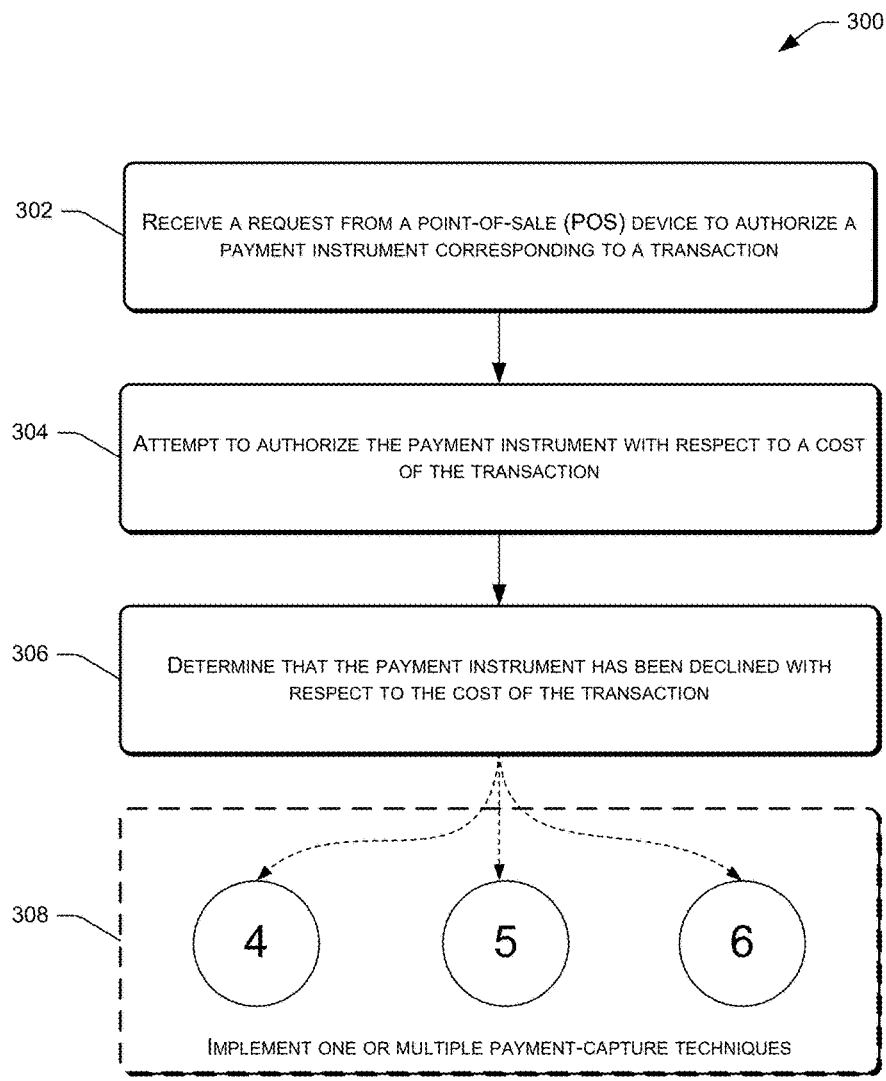
FIG. 3 illustrates a flow diagram of an example process for capturing a payment in a transaction involving a payment instrument that previously has been declined with respect to the transaction.

FIG. 3 illustrates a flow diagram of an example process for capturing a payment in a transaction involving a payment instrument that has previously been declined with respect to the transaction, as described in further detail above with reference to FIGS. 1A-2.

The process 300 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 300 and other processes described herein may be performed by a POS device, by a payment service, by another entity, or by a combination thereof.

At 302, the process 300 may receive a request from a point-of-sale (POS) device to authorize a payment instrument corresponding to a transaction. In various cases, the POS device may have processed the transaction while operating in an offline mode.

At 304, the process 300 may attempt to authorize the payment instrument with respect to a cost of the transaction. For example, suppose a customer purchased an item from a merchant for a $100 cost. In this example, the process 300 may attempt to authorize the payment instrument for $100.

At 306, the process 300 may determine that the payment instrument has been declined with respect to the cost of the transaction. Keeping with the previous example, the process 300 may determine that the payment instrument has been declined with respect to the $100 cost. In some cases, this may be due to "insufficient funds." For instance, at the time of the attempted authorization, the authorizable value of the payment instrument may have been $80, and therefore insufficient to satisfy the $100 cost of the transaction. In the context of a payment instrument associated with a credit line, an available amount of the credit line may be insufficient to satisfy the cost of the transaction.

At 308, the process 400 may implement one or multiple payment-capture techniques. For instance, in some cases, the process 400 may implement a single payment capture technique to capture a payment (or multiple payments) that satisfies at least a portion of the cost of the transaction. In other cases, the process 400 may implement multiple payment-capture techniques to capture a payment (or multiple payments) that satisfies at least a portion of the cost of the transaction. The process 400 may implement the payment-capture techniques in various sequences and/or combinations.

Figure 4:
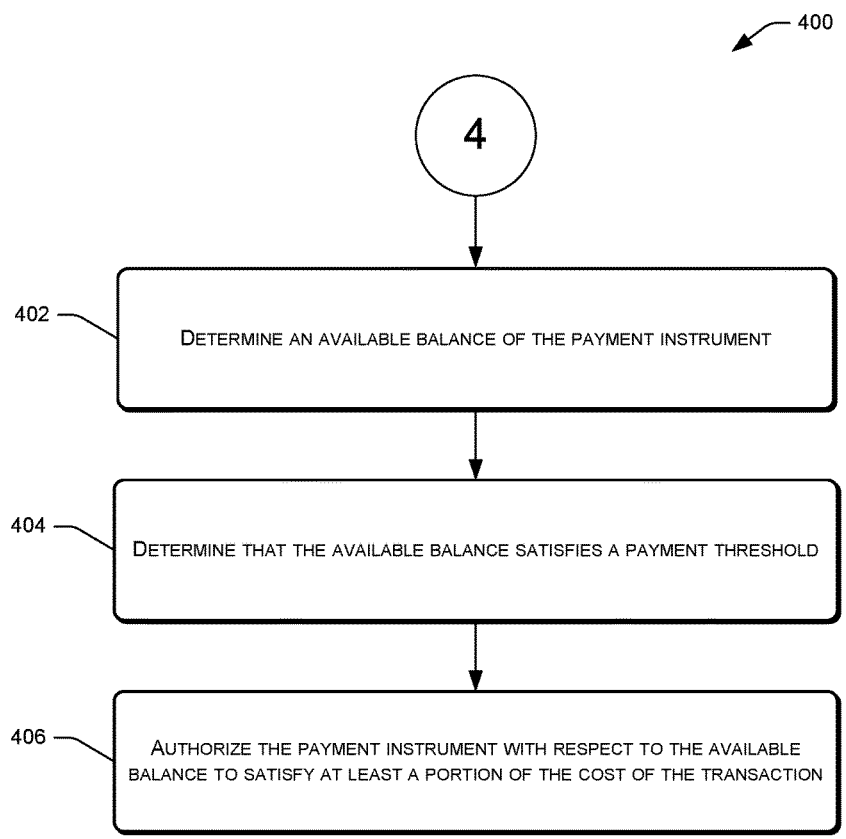
FIG. 4 illustrates a flow diagram of another example process for capturing a payment in a transaction involving a payment instrument that has previously been declined with respect to the transaction. This example process includes authorizing the payment instrument with respect to an available balance of the payment instrument.

FIG. 4 illustrates a flow diagram of another example process 400 for capturing a payment in a transaction involving a payment instrument that has previously been declined with respect to the transaction. This example process 400 includes authorizing the payment instrument with respect to an available balance of the payment instrument, as described in further detail above with reference to FIGS. 1A-2.

At 402, the process 400 may determine an available balance of the payment instrument. For instance, the process 400 may receive a decline reason and an indication of an available balance of the payment instrument upon or after the payment instrument being declined. The process 400 may determine the available balance based at least in part on the received indication.

At 404, the process 400 may determine that the available balance satisfies a payment threshold. The payment threshold may represent, or otherwise correspond to, an acceptable payment towards the cost of the transaction. For example, a merchant associated with the transaction may determine a percentage (or the like) of the transaction that the merchant would accept in the event that the payment instrument is declined with respect to the cost of the transaction.

At 406, the process 400 may authorize, or cause to authorize, the payment instrument with respect to the available balance to satisfy at least a portion of the cost of the transaction. For example, the process 400 may generate a request to authorize the payment instrument with respect to the available balance. The process 400 may send the request to one or more computing devices of a card payment network and/or an issuing bank associated with the payment instrument. The process 400 may then receive an indication indicating that the payment instrument has been authorized with respect to the available balance. In some cases, the process 400 may authorize the payment instrument with respect to the available balance in response to determining, at 404, that the available balance satisfies the payment threshold. However, in other cases, the process 400 may authorize the payment instrument with respect to the available balance without checking the available balance against a payment threshold.

Figure 5:
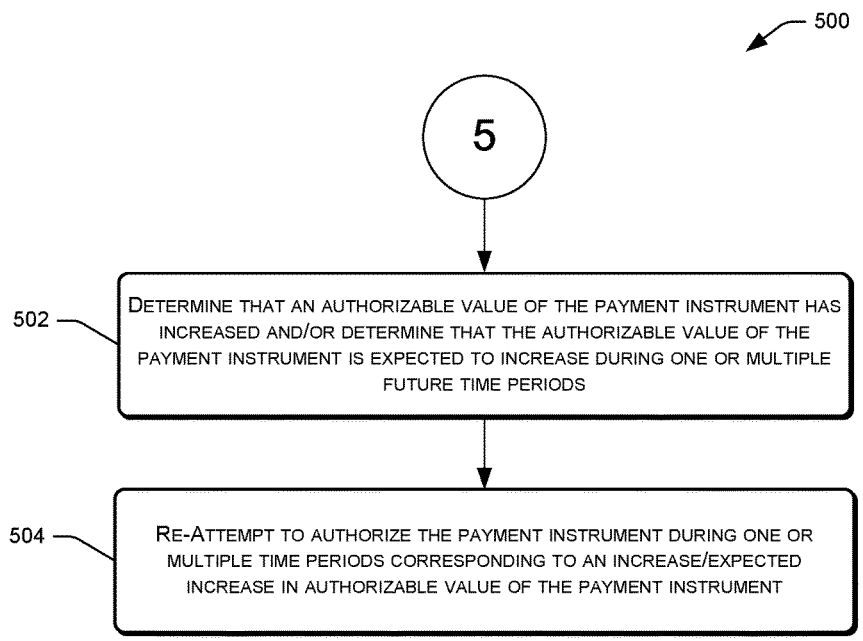
FIG. 5 illustrates a flow diagram of yet another example process for capturing a payment in a transaction involving a payment instrument that has previously been declined with respect to the transaction. This example process includes re-attempting to authorize the payment instrument after the payment instrument has been declined.

FIG. 5 illustrates a flow diagram of yet another example process 500 for capturing a payment in a transaction involving a payment instrument that has previously been declined with respect to the transaction. This example process 500 includes re-attempting to authorize the payment instrument after the payment instrument has been declined, as described in further detail above with reference to FIGS. 1A-2.

At 502, the process 500 may determine that an authorizable value of the payment instrument has increased and/or determine that the authorizable value of the payment instrument is expected to increase during one or multiple future time periods. For instance, the process 500 may analyze historical transaction data to determine one or multiple future time periods during which the authorizable value of the payment instrument is expected to increase. Then, at 504, the process 500 may re-attempt to authorize the payment instrument during one or multiple time periods corresponding to an increase/expected increase in the authorizable value of the payment instrument.

Figure 6:
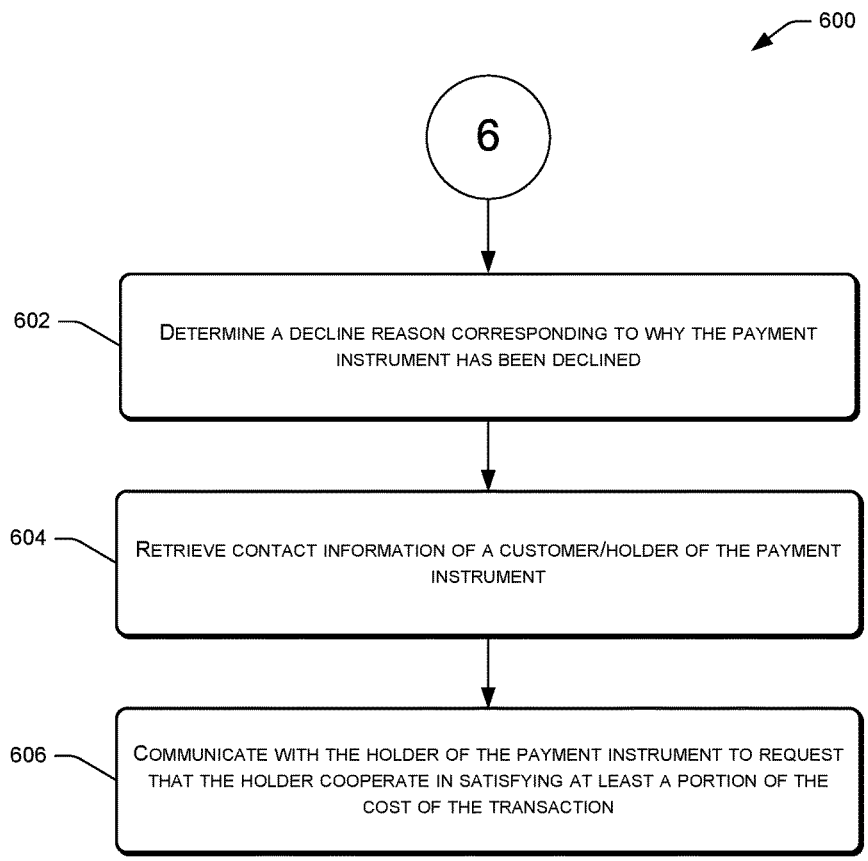
FIG. 6 illustrates a flow diagram of still yet another example process for capturing a payment in a transaction involving a payment instrument that previously has been declined with respect to the transaction. This example process includes contacting a customer/holder of the payment instrument to request that the customer/holder cooperate in satisfying at least a portion of the cost of the transaction.

FIG. 6 illustrates a flow diagram of still yet another example process 600 for capturing a payment in a transaction involving a payment instrument that has been declined with respect to the transaction. This example process 600 includes communicating with a customer/holder of the payment instrument to request that the customer/holder cooperate in satisfying at least a portion of the cost of the transaction, as described in further detail above with reference to FIGS. 1A-2.

At 602, the process 600 may determine a decline reason corresponding to why the payment instrument has been declined. For example, the decline reason may correspond to the payment instrument lacking sufficient funds to satisfy the cost of the transaction. In some instances, the decline reason may correspond to a fraud alert placed on the payment instrument.

At 604, the process 600 may retrieve contact information of a customer. For instance, the customer may have provided contact information at the time of the transaction. In some cases, the process 600 may retrieve the contact information by searching for the contact information in one or more databases.

At 606, the process 600 may communicate with the customer to request that the customer cooperate in satisfying at least a portion of the cost of the transaction. For instance, the customer may be asked to satisfy at least a portion of the cost of the transaction via one or more of the payment instrument or another payment instrument. In various examples, the process 600 may communicate with the customer by one or more of: sending the customer an automated e-mail, sending the customer an e-mail requesting permission to re-attempt to authorize the payment instrument, sending the customer a form for inputting valid payment instrument information, or sending the customer a copy of a digital receipt that includes transaction information associated with the transaction. Additionally or alternatively, communicating with the customer may include placing phone calls to the customer via, for example, an automated calling system and/or a human agent.

Figure 7:
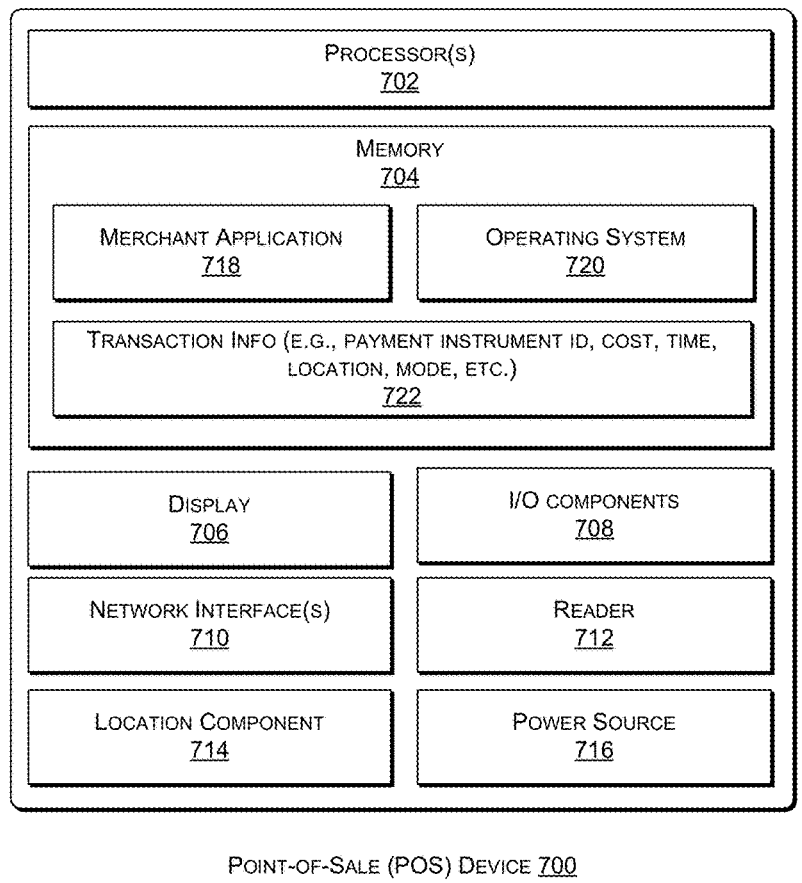
FIG. 7 illustrates select components of a POS device that a merchant described herein may utilize.

FIG. 7 illustrates select example components of an example POS device 700 according to some implementations. The POS device 700 may be any suitable type of computing device, e.g., mobile, semi-mobile, semi-stationary, or stationary. Some examples of the POS device 700 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 700 includes at least one processor 702, memory 704, a display 706, one or more input/output (I/O) components 708, one or more network interfaces 710, at least one card reader 712, at least one location component 714, and at least one power source 716. Each processor 702 may itself comprise one or more processors or processing cores. For example, the processor 702 can be implemented as one or more microprocessors, microcomputers, microcontrollers, digital signal processors, central processing units, state machines, logic circuitries, and/or any devices that manipulate signals based on operational instructions. In some cases, the processor 702 may be one or more hardware processors and/or logic circuits of any suitable type specifically programmed or configured to execute the algorithms and processes described herein. The processor 702 can be configured to fetch and execute computer-readable processor-executable instructions stored in the memory 704.

Depending on the configuration of the POS device 700, the memory 704 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 704 may include, but is not limited to, RAM, ROM, EEPROM, flash memory, solid-state storage, magnetic disk storage, optical storage, and/or other computer-readable media technology. Further, in some cases, the POS device 700 may access external storage, such as RAID storage systems, storage arrays, network attached storage, storage area networks, cloud storage, or any other medium that can be used to store information and that can be accessed by the processor 702 directly or through another computing device or network. Accordingly, the memory 704 may be computer storage media able to store instructions, modules or components that may be executed by the processor 702. Further, when mentioned, non-transitory computer-readable media exclude media such as energy, carrier signals, electromagnetic waves, and signals per se.

The memory 704 may be used to store and maintain any number of functional components that are executable by the processor 702. In some implementations, these functional components comprise instructions or programs that are executable by the processor 702 and that, when executed, implement operational logic for performing the actions and services attributed above to the POS device 700. Functional components of the POS device 700 stored in the memory 704 may include a merchant application 718, discussed above. The merchant application 718 may present an interface on the POS device 700 to enable the merchant to conduct transactions, receive payments, and so forth, as well as communicating with the payment service 208 for processing payments and sending transaction information. Further, the merchant application 718 may present an interface to enable the merchant to manage the merchant's account, and the like. The merchant application 718 may also include some or all of the functionality described above with reference to the payment processing module 216, the mode transition module 218, the payment capture module 220, or the inference module 222. Additional functional components may include an operating system 720 for controlling and managing various functions of the POS device 700 and for enabling basic user interactions with the POS device 700. The memory 704 may also store transaction information/data 722 that is received based on the merchant associated with the POS device 700 engaging in various transactions with customers, such as the example customers 206 from FIG. 2.

In addition, the memory 704 may also store data, data structures and the like, that are used by the functional components. For example, this data may include item information that includes information about the items offered by the merchant, which may include images of the items, descriptions of the items, prices of the items, and so forth. Depending on the type of the POS device 700, the memory 704 may also optionally include other functional components and data, which may include programs, drivers, etc., and the data used or generated by the functional components. Further, the POS device 700 may include many other logical, programmatic and physical components, of which those described are merely examples that are related to the discussion herein.

The network interface(s) 710 may include one or more interfaces and hardware components for enabling communication with various other devices over the network or directly. For example, network interface(s) 710 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 7 further illustrates that the POS device 700 may include the display 706 mentioned above. Depending on the type of computing device used as the POS device 700, the display 706 may employ any suitable display technology. For example, the display 706 may be a liquid crystal display, a plasma display, a light emitting diode display, an OLED (organic light-emitting diode) display, an electronic paper display, or any other suitable type of display able to present digital content thereon. In some examples, the display 706 may have a touch sensor associated with the display 706 to provide a touchscreen display configured to receive touch inputs for enabling interaction with a graphic interface presented on the display 706. Accordingly, implementations herein are not limited to any particular display technology. Alternatively, in some examples, the POS device 700 may not include the display 706, and information may be presented by other means, such as aurally.

The I/O components 708, meanwhile, may include speakers, a microphone, a camera, various user controls (e.g., buttons, a joystick, a keyboard, a keypad, etc.), and/or a haptic output device, and so forth.

In addition, the POS device 700 may include or may be connectable to a payment instrument reader 712. In some examples, the reader 712 may plug in to a port in the merchant device, such as a microphone/headphone port, a data port, or other suitable port. In other instances, the reader 712 is integral with the entire POS device 700. The reader may include a read head for reading a magnetic strip of a payment card, and further may include encryption technology for encrypting the information read from the magnetic strip. Alternatively, numerous other types of card readers may be employed with the POS devices 700 herein, depending on the type and configuration of a particular POS device 700.

The location component 714 may include a GPS device able to indicate location information, or the location component 714 may comprise any other location-based sensor. The POS device 700 may also include one or more additional sensors (not shown), such as an accelerometer, gyroscope, compass, proximity sensor, and the like. Additionally, the POS device 700 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
 a first point of sale (POS) device associated with a first merchant, the first POS device comprising:
  a card reader;
  a first processor; and
  first computer-readable media storing first instructions that, when executed by the first processor, cause the first processor to perform operations comprising:
   storing, while the first POS device operates in an offline mode, first transaction information identifying a first payment instrument tendered to satisfy a cost of a first transaction between the first merchant and a holder of the payment instrument, wherein the first POS device does not transmit the first transaction information to a remote device in the offline mode;
   transitioning from the offline mode to an online mode; and
   automatically sending the first transaction information to the remote device based at least in part on the first POS device establishing network connectivity;
 the remote device comprising:
  a second processor;
  second computer-readable media storing second instructions that, when executed by the second processor, cause the second processor to perform operations comprising:
   receiving, from the first POS device operating in the online mode, the first transaction information;
   determining that the first transaction was processed by the first POS device in the offline mode;
   submitting a first request to authorize the payment instrument with respect to the cost of the first transaction;

receiving a first indication that the payment instrument has been declined with respect to the cost of the first transaction;

receiving a second indication that the payment instrument has been authorized with respect to a second transaction, the second transaction conducted with respect to a second POS device associated with a second merchant and after receiving the first indication; and submitting, based at least in part on receiving the first indication and the second indication, a second request to authorize the payment instrument with respect to the cost of the first transaction.

2. The system of claim 1, wherein the second instructions further cause the second processor to perform operations comprising:

receiving a third indication after submitting the second request to authorize the payment instrument, the third indication indicating that the payment instrument has again been declined with respect to the cost of the first transaction; and submitting, based at least in part on receiving the third indication, a third request to authorize the payment instrument with respect to an available balance of the payment instrument.

3. The system of claim 2, wherein the instructions further cause the second processor to perform operations comprising:

determine that the available balance satisfies a payment threshold; and wherein submitting the third request to authorize the payment instrument with respect to the available balance of the payment instrument also occurs based at least in part on determining that the available balance satisfies the payment threshold.

4. A method comprising:

storing, at a first point of sale (POS) device using a card reader, and while the first POS device is in an offline mode, first transaction information identifying a first payment instrument tendered to satisfy a cost of a first transaction between a first merchant and a holder of the payment instrument, wherein the first POS device does not transmit the first transaction information to a remote device in the offline mode;

transitioning the first POS device from the offline mode to the online mode;

automatically sending the first transaction information to the remote device based at least in part on the first POS device establishing network connectivity;

receiving, by the remote device and from the first POS device operating in the online mode, the first transaction information;

submitting a first request to authorize the payment instrument with respect to the cost of the first transaction;

receiving a first indication that the payment instrument has been declined with respect to the cost of the first transaction;

receiving a second indication that the payment instrument has been authorized with respect to a second transaction, the second transaction conducted with respect to a second POS device associated with a second merchant and after reviewing the first indication; and submitting, based at least in part on receiving the first indication and the second indication, a second request to authorize the payment instrument with respect to the cost of the first transaction.

5. The method of claim 4, further comprising receiving a third request to authorize the payment instrument with respect to the second transaction.

6. The method of claim 5, further comprising submitting, based at least in part on receiving the third request, a fourth request to authorize the payment instrument with respect to the second transaction.

7. The method of claim 4, wherein the transitioning comprises transitioning the first POS device to the online mode based at least in part on an amount of transactions associated with the first merchant being over a threshold.

8. The method of claim 4, further comprising:

receiving, based at least in part on submitting the second request, a third indication that the payment instrument has been declined with respect to the cost of the first transaction; and sending, based at least in part on receiving the third indication, a third request to the holder of the payment instrument to submit a second payment instrument to satisfy the cost of the first transaction, the second payment instrument being different than the first payment instrument.

* * * * *